3,250,828
O,O-DIMETHYL-S-(1,2,2-TRICHLOROETHYL) MONOTHIOPHOSPHATE

Jack Hensel, Fairway, and Paul C. Aichenegg, Prairie Village, Kans., assignors to Chemagro Corporation, New York, N.Y., a corporation of New York
No Drawing. Filed Aug. 13, 1965, Ser. No. 479,661
1 Claim. (Cl. 260—963)

This is a continuation-in-part of application Serial No. 366,609, filed May 11, 1964, which in turn is a division of application Serial No. 158,888, filed December 12, 1961, now Patent 3,184,337.

The present invention relates to a novel thiophosphate.

An object of the present invention is to prepare a novel S-polychloroethyl thiophosphate.

An additional object is to develop an improved nematocide.

Another object is to develop an improved insecticide of low mammalian toxicity.

A further object is to develop an improved bactericide.

Yet another object is to develop an improved fungicide.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing O,O-dimethyl-S-(1,2,2-trichloroethyl) monothiophosphate having the formula

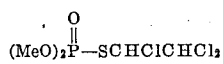

$$(MeO)_2\overset{O}{\underset{\|}{P}}-SCHClCHCl_2$$

This compound is more active than the isomeric O,O-dimethyl-S-(2,2,2-trichloroethyl) monothiophosphate as a nematocide. It was also effective as a bactericide, fungicide and insecticide.

The O,O-dimethyl-S-(1,2,2-trichloroethyl) monothiophosphate is prepared by reacting dimethyl phosphite with 1,2,2-trichloroethyl sulfenyl chloride. The HCl formed is removed preferably under reduced pressure as a gas or less preferably by neutralizing the crude reaction mixture obtained.

The temperature of reaction can be varied, e.g., room temperature can be employed. However, preferably the reaction is initiated at lower temperatures since the sulfenyl halides have a tendency to decompose at elevated temperatures.

The general procedure for preparing O,O-dimethyl-S-(1,2,2-trichloroethyl) monothiophosphate was as follows:

A known quantity of dimethyl phosphite was dissolved in 2–3 parts of dry carbon tetrachloride as a solvent and cooled to 0° C. by means of an ice bath. The apparatus was protected from atmospheric moisture and connected to a 200–250 mm. Hg vacuum, which was applied throughout the total reaction period to assist in removal of the HCl formed. Slightly less than an equimolar quantity of the desired sulfenyl chloride was then added dropwise to the well stirred dimethyl phosphite-carbon tetrachloride solution. The addition rate was adjusted to maintain the reaction temperature between 4 and 8° C. For 0.1 molar quantities, 30 to 40 minute periods were necessary for this operation. The reaction rate was very high and easily visible by the almost instantaneous decoloration of the reacting sulfenyl chloride which is of distinct orange to dark red colors.

Toward the end of the sulfenyl chloride addition, however, the reaction slowed down considerably. The reaction mixture was allowed to warm to room temperature and stirred for 1–1.5 hours at that temperature to complete the reaction. In many cases the products were left overnight at room temperature before the isolation of the desired reaction product was undertaken.

The vacuum was then disconnected, the mixture cooled to 0–5° C. and water was added slowly with stirring at a temperature not over 15°C. The product was transferred to a separatory funnel, the separated carbon tetrachloride solution washed with dilute sodium bicarbonate and the acid free organic layer thus obtained dried over anhydrous magnesium sulfate. The product was stripped to yield the desired product in yields ranging from 75% to quantitative. The final products were of high purity and were colorless to pale yellow oils having a high solubility in most common organic solvents. Purification was accomplished by distillation in a high vacuum.

Unless otherwise indicated all parts and percentages are by weight.

Example 1

9.0 grams (0.082 mol) of dimethyl phosphite were dissolved in 20 ml. of dry carbon tetrachloride and treated in the manner described above with 15 grams (0.075 mol) of 1,2,2-trichloroethyl sulfenyl chloride to give 17.5 grams (85% yield) of practically pure O,O-dimethyl-S-(1,2,2-trichloroethyl) thiophosphate as a dark yellow oil, $n_D^{28}$ 1.5112. Distillation proceeded without decomposition at 113–114° C. at 0.06 mm. Hg to give the pure product as a yellow oil, $n_D^{28}$ 1.5120, $d_{20}^{20}$ 1.5254, Cl 39.3% (theory 38.9%), S 11.5% (theory 11.7%), P 11.4% (theory 11.3%). The infrared spectrum showed absorptions at 1275 cm.$^{-1}$ (P=O), 1010–1070 cm.$^{-1}$ (P—O—C) and at 725 and 750–810 cm.$^{-1}$ (C—Cl). The C=C peak at about 1560 cm.$^{-1}$ was missing.

The compound of the present invention can be used alone as a nematocide, fungicide, bactericide or insecticide but it has been found desirable to apply it to the pest, e.g., to the soil habitat of nematodes, together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, isopropanol and amyl alcohol, etc.

The novel pesticide can also be applied as an aerosol, e.g. by dispersing it in air by means of a compressed gas such as dichlorodifluoromethane or trichlorofluoromethane and other Freons.

The pesticide of the present invention can also be applied with inert nematocidal, fungicidal, bactericidal or insecticidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the pesticidal compositions of this invention. Such surface active agents, i.e., wetting agent, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzene sulfonates having 14 to 18 carbon atoms in the alkyl group, alkylphenol-ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation products, e.g., Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

In the following examples or tables illustrating nematocidal activity the thiophosphates were formulated as wettable powders consisting of 50% thiophosphate, 46% Hi-Sil 233 (ultra fine silica), 2% Marasperse N (sodium lignin sulfonate) and 2% Pluronic L-61 (polyethylene oxide-propylene oxide molecular weight about 1000). This wettable powder is hereinafter designated as Formulation A.

These 50% by weight thiophosphate containing wettable powders were diluted with water to such an extent as to obtain final concentrations of the thiophosphates of 200, 100, 50, 25 and 12.5 p.p.m. during the actual tests.

The saprophytic nematode tests were carried out in water as the medium with *Panagrellus* and *Rhabditis* spp. at room temperature. The results were recorded as percent kill after a 4 days' incubation period. In Table 1 there was used pure trichloroethyl thiophosphates. In a blank run the mortality was 5%.

*Table 1*

| Compound | 200 p.p.m. | 100 p.p.m. | 50 p.p.m. | 25 p.p.m. | 12.5 p.p.m. |
|---|---|---|---|---|---|
| $(MeO)_2P(O)SCHClCHCl_2$ | 100 | 100 | 80 | 80 | 80 |
| $(EtO)_2P(O)SCHClCHCl_2$ | 100 | 100 | 100 | 100 | 80 |
| $(2\text{-}EtHexO)_2P(O)SCHClCHCl_2$ | 20 | 5 | 5 | 5 | 5 |
| $(MeO)_2P(O)SCH_2CCl_3$ | 100 | 60 | 30 | 5 | 5 |

O,O - dimethyl-S-(1,2,2-trichloroethyl) monothiophosphate was tested as a bactericide. It was incorporated in Formulation A and this mixture added to an agar culture of the bacteria. At 1000 p.p.m. it showed activity against *Erwinia carotovora* and *Xanthomonas vesicatoria* and it was effective against *Pseudomonas coronafacions* at a concentration as low as 100 p.p.m.

O,O - dimethyl-S-(1,2,2-trichloroethyl) monothiophosphate was also tested as a fungicide in a plate fungicide test. It was made up into Formulation A and then added to agar cultures of the fungi. Against *Pythium* spp., it was 100% effective at 1000 p.p.m. and 60% effective at 100 p.p.m. Against *Rhizoctonia* it was 60% effective at 1000 p.p.m. and 10% effective at 100 p.p.m.

In tests against the Mexican bean beetles an aqueous dispersion was sprayed on the plants and it was found to be effective. Alternatively it could be sprayed on the ground surrounding the plants.

In Table 2 there is shown the percent control at two hours at the indicated parts per million of several chemicals against the indicated insects.

*Table 2*

| Compound | Flour beetle 1,000 p.p.m. | Flour beetle 100 p.p.m. | House fly, 100 p.p.m. | German cockroach 1,000 p.p.m. | German cockroach 100 p.p.m. |
|---|---|---|---|---|---|
| $(MeO)_2\overset{O}{\overset{\|}{P}}OCHClCHCl_2$ | 100 | 100 | 100 | 100 | 100 |
| $(MeO)_2\overset{O}{\overset{\|}{P}}SCHClCHCl_2$ | 100 | 100 | 90 | 100 | 100 |
| $(MeO)_2\overset{O}{\overset{\|}{P}}SCHCl_2$ | 100 | 100 | 0 | 100 | 0 |
| $(EtO)_2\overset{O}{\overset{\|}{P}}OCHClCHCl_2$ | 100 | 100 | 100 | 100 | 100 |
| $(EtO)_2\overset{O}{\overset{\|}{P}}SCHClCHCl_2$ | 100 | 100 | 100 | 100 | 100 |

In mammalian toxicity studies, however, the O,O-dimethyl - S - (1,2,2 - trichloroethyl) monothiophosphate proved to be considerably safer to use than the other compounds as shown in Table 3 in which the rates of application are set forth in mg./kg. of rat body weight.

Table 3

| Compound | No. dead of 3 rats oral (10 mg./kg.) | No. dead of 4 rats male dermal (100 mg./kg.) |
|---|---|---|
| $(MeO)_2\overset{O}{\overset{\|}{P}}OCHClCHCl_2$ | 3 | 4 |
| $(MeO)_2\overset{O}{\overset{\|}{P}}SCHClCHCl_2$ | 0 | 0 |
| $(MeO)_2\overset{O}{\overset{\|}{P}}SCHCl_2$ | 3 | 4 |
| $(EtO)_2\overset{O}{\overset{\|}{P}}OCHClCHCl_2$ | 3 | 4 |
| $(EtO)_2\overset{O}{\overset{\|}{P}}SCHClCHCl_2$ | 3 | 4 |

It is of course important that any pesticide have low mammalian toxicity. Consequently the O,O-dimethyl -S-(1,2,2-trichloroethyl) monothiophasphate can be employed for this reason as a pesticide in many areas where the other compounds cannot.

The O,O - dimethyl - S - dichloromethyl phosphate of Tables 2 and 3 is the compound of Birum Patent 2,931,-753, Example 3. The O,O-dimethyl-O-(1,2,2-trichloroethyl) phosphate and the O,O-diethyl-O-(1,2,2-trichloroethyl) phosphate of Tables 2 and 3 are typical examples of compounds coming within Whetstone Patent 3,027,296, the latter compound being made in Whetstone Example 3.

It is also of interest to note that the O,O-dimethyl-S-(1,2,2-trichloroethyl) monothiophasphate of the present invention has a much lower mammalian toxicity than its O,O-ethyl homologue.

We claim:

O,O - dimethyl-S-(1,2,2-trichloroethyl) monothiophosphate.

No references cited.

CHARLES B. PARKER, *Primary Examiner.*